(12) United States Patent
Cardinell

(10) Patent No.: US 7,523,450 B2
(45) Date of Patent: Apr. 21, 2009

(54) APPARATUS, SYSTEM, AND METHOD FOR IDENTIFYING FIXED MEMORY ADDRESS ERRORS IN SOURCE CODE AT BUILD TIME

(75) Inventor: Charles Scott Cardinell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/989,181

(22) Filed: Nov. 15, 2004

(65) Prior Publication Data

US 2006/0123279 A1    Jun. 8, 2006

(51) Int. Cl.
G06F 9/44 (2006.01)
G06F 9/45 (2006.01)

(52) U.S. Cl. .................. 717/162; 717/140; 717/159

(58) Field of Classification Search ............ 717/151, 717/140, 159, 162
See application file for complete search history.

(56) References Cited

U.S. PATENT DOCUMENTS

| | | | |
|---|---|---|---|
| 5,339,419 A * | 8/1994 | Chan et al. .................. 717/147 |
| 5,355,469 A | 10/1994 | Sparks et al. |
| 5,383,977 A | 1/1995 | Pearce |
| 5,568,635 A | 10/1996 | Yamaguchi |
| 5,583,988 A * | 12/1996 | Crank et al. ................. 714/48 |
| 5,590,329 A | 12/1996 | Goodnow et al. |
| 5,663,969 A | 9/1997 | Tsou |
| 5,926,227 A | 7/1999 | Schoner et al. |
| 6,105,039 A | 8/2000 | Douceur et al. |
| 6,298,481 B1 * | 10/2001 | Kosaka et al. ............... 717/110 |
| 6,343,378 B1 | 1/2002 | Moroda ........................ 717/10 |
| 6,363,467 B1 | 3/2002 | Weeks |
| 6,523,101 B1 * | 2/2003 | Nakata ........................ 711/169 |
| 6,697,971 B1 | 2/2004 | Dwyer |
| 6,732,296 B1 * | 5/2004 | Cherny et al. ................ 714/32 |
| 6,983,458 B1 * | 1/2006 | Honda ......................... 717/151 |

(Continued)

FOREIGN PATENT DOCUMENTS

JP    2001125775    11/2001

OTHER PUBLICATIONS

Samual Pl Harbison and Guy L. Steele Jr., "C A reference Manual", 1995, Prentice-Hall, Inc., 4th Edition, pp. 39-63.*

(Continued)

*Primary Examiner*—Lewis A Bullock, Jr.
*Assistant Examiner*—Greg Pollock
(74) *Attorney, Agent, or Firm*—Kunzler & McKenzie

(57) ABSTRACT

An apparatus, system, and method are provided for identifying fixed memory address errors in source code at build time. A substitution module substitutes fixed memory address values for hardcoded memory address symbols. The fixed memory address values are substituted according to a mapping between fixed memory address values and hardcoded memory address symbols. A determination module determines size and location information for variables associated with the hardcoded memory address symbols by referencing precompiled object code. A generation module generates one or more conditions and/or memory region conditions that verify memory boundary and/or capacity constraints based on size and location information provided by the determination module. An evaluation module evaluates the conditions and signals an error in response to violation of one of the conditions and/or memory region conditions. The evaluation module may be a conventional build process component such as a conventional source code preprocessor.

37 Claims, 7 Drawing Sheets

U.S. PATENT DOCUMENTS

| | | | |
|---|---|---|---|
| 7,036,118 B1* | 4/2006 | Ulery et al. | 717/159 |
| 7,080,359 B2* | 7/2006 | Ullmann et al. | 717/128 |
| 7,089,270 B2* | 8/2006 | Ren et al. | 707/203 |
| 2004/0098420 A1* | 5/2004 | Peng | 707/203 |
| 2007/0067316 A1* | 3/2007 | Popp | 707/100 |

OTHER PUBLICATIONS

William Gatliff, "An introduction to the GNU compiler and linker", pp. 1, 10-14, & 19, published 2001.

"Linker Scripts" http://www.ugcs.caltech.edu/info/binutils/ld_3.html, pp. 1-3, 5-7, 15, & 17-18, published: Oct. 14, 2004.

"The Preprocessor", http://www.cs.cf.ac.uk/Dave/C/node3.html, publihsed: Oct. 13, 2004.

"The C Preprocessor", http://www.cs.cf.ac.uk/Dave/C/node14.html, pp. 1-5, published: Oct. 14, 2004.

* cited by examiner

APPARATUS, SYSTEM, AND METHOD FOR IDENTIFYING FIXED MEMORY ADDRESS ERRORS IN SOURCE CODE AT BUILD TIME

BACKGROUND OF THE INVENTION

1. Field of the Invention

The invention relates to software development. Specifically, the invention relates to apparatus, systems, and methods for identifying fixed memory address errors in source code at build time.

2. Description of the Related Art

Software development generally includes writing source code (human readable code) and then using various tools to convert the source code into machine code also referred to as executable code, machine-readable code, executable code image, image file or the like. In general purpose software development, the programmer is not concerned with where specific portions of the source code, such as particular routines and data structures, are placed in memory when the object code is executed. Typically, these components are dynamically loaded and could be relocated in memory by the operating system as needed.

However, embedded system software programmers are typically very concerned with how components in source code are eventually organized in memory of the embedded system particularly where the executable code is loaded once statically and executable code structures are not relocated by an operating system of the embedded system. Generally, the use and organization of memory of the embedded system is carefully coordinated between one or more programmers and/or teams of programmers. This coordination is often required in order to use a particular data structure at a particular memory address (referred to herein as a hardcoded memory address) for messaging between one or more subsystems of the embedded system.

Typically, the memory in an embedded system is shared by multiple hardware devices including Central Processing Unit (CPUs), Application Specific Integrated Circuits (ASICs), and the like. These hardware devices may be hardwired to branch to a specific location in the shared memory (known as an entry point) to begin executing executable code, also referred to as microcode. Accordingly, as the microcode originates in source code files, hardcoded memory addresses in the source code are used to place the microcode where the hardware devices are expecting to find it.

Certain embedded systems may include different types of memory that are more suitable for particular needs of operations in the embedded system. For example, the embedded system can include Read-Only-Memory (ROM), Random-Access-Memory (RAM), Cached memory, on-board high speed memory, external memory, and the like. The different types of memory are often logically combined into a single memory block with each type of memory having a specific start and stop address. Accordingly, programmers can use the hardcoded start and stop addresses to programmatically manage where certain data structures are stored in the memory hardware. Hardcoded memory addresses are often used to optimize performance and reliability of embedded systems.

Hardcoded memory addresses are generally designated using hexadecimal notation. Generally, a memory map or memory layout is used to coordinate and organize use of memory resources in an embedded system. The memory map designates where executable code will be stored as well as data structures, both initialized and uninitialized.

Unfortunately, conventional programming languages and tools in widespread use fail to provide a common location for designating hardcoded addresses. Furthermore, tracking sizes and locations of hardcoded memory structures, even when using a memory map, can be difficult because programmers may underestimate the size required for data structures having a variable size. Managing hardcoded memory addresses can be further complicated by a lack of communication between programmers due to different software development schedules and affiliations of the programmers with different companies all collaborating to produce the embedded system.

These challenges often lead to errors in use of the memory. Certain data structures may corrupt others because an incorrect start or stop address is specified. This type of memory error is referred to herein as a memory boundary error or an overlap error. Other custom-defined memory regions can be filled with data structures for which the combined size is greater than the custom-defined memory region. This type of memory error is referred to herein as a memory capacity error or an overflow error.

Unfortunately, conventional programming tools do not permit detection of these errors until the source code is fully compiled and built in to executable code and the executable code is executed. Generally, embedded system programmers are forced to wait for these errors to be discovered in a test environment or worse yet in the deployed environment.

Management of hardcoded memory addresses is made more difficult because conventional embedded system programming tools require that separate definition files be used in the build process to designate hardcoded memory addresses in the source code for the compiler and in a link directive file for the linker. FIG. 1 illustrates a conventional build process that requires separate definition files to define hardcoded memory addresses both for data structures and for memory regions.

The system 100 includes a compiler 102 and a linker 104. Optionally, an assembler may assemble assembly code produced by the compiler 102 and provide the assembled code to the linker 104. Alternatively, the assembler can be integrated with the compiler 102.

The compiler 102 reads in one or more source code files 106 and produces object code. Generally, the source code 106 references variable constants that have associated hardcoded memory addresses. A programmer defines the hardcoded memory addresses directly in source code. The hardcoded memory addresses or constants associated therewith are used in logic of the source code.

The linker 104 links multiple object code files into a single executable image or file. The linker 104 is configured to produce an image file 108 compatible with the memory architecture of the target embedded system platform. In order to define custom memory regions for certain data structures and to utilize specialized memory hardware, the linker reads a link directive file or script 110. The link directive file 110 includes hardcoded memory addresses and commands in a syntax understandable to the linker 104.

Unfortunately, the same memory addresses are designated in both the source code 106 and the link directive file 110. Consequently, changes to one file 106 must be duplicated in the other file 110 and vice versa. Programmers may fail to make the change in both places. Similarly in large projects, the ripple effect of a change in one file may be untraceable through the other file or files.

FIG. 1 also illustrates various errors that incorrect hardcoded memory addresses can cause. For example, processors 112, 114 may branch to entry points 116, 118 but the microcode for that processor 112, 114 may not be positioned at the expected entry point 116, 118. A data structure such as data structure B2 may begin prior to the stop address of data structure B1 (boundary error). Another data structure 120 of a fixed size may attempt to include data structures DS1, DS2, and DS3 that exceed the capacity of the data structure 120. This can happen as fields within the data structures combine to take more space than was anticipated by the programmer.

From the foregoing discussion, it should be apparent that a need exists for an apparatus, system, and method for identifying fixed memory address errors in source code at build time. Such an apparatus, system, and method would allow consolidation of hardcoded memory address definitions. In addition, the apparatus, system, and method would check hardcoded memory address definition during build time such that hardcoded memory address are detectable before the executable code is executed.

SUMMARY OF THE INVENTION

The present invention has been developed in response to the present state of the art, and in particular, in response to the problems and needs in the art that have not yet been met to identify fixed memory address errors in source code at build time. Accordingly, the present invention has been developed to provide an apparatus, system, and method that identifies fixed memory address errors in source code at build time that overcomes many or all of the above-discussed shortcomings in the art.

An apparatus according to the present invention includes a substitution module, a determination module, a generation module, and an evaluation module. The substitution module substitute fixed memory address values for hardcoded memory address symbols. The fixed memory address values are substituted according to a mapping between fixed memory address values and hardcoded memory address symbols. The mapping is defined in a common resource used both to compile source code and to link object code compiled from the source code.

The determination module determines size and location information for variables associated with the hardcoded memory address symbols by referencing object code. The object code is compiled from the source code. The generation module generates one or more conditions that verify that the variables satisfy memory boundary constraints based on the size and location information provided by the determination module. The evaluation module evaluates the conditions and signals an error in response to violation of one of the conditions. Preferably, the evaluation module comprises a conventional build process component such as conventional preprocessor for source code. In one embodiment, the conventional preprocessor is a C programming language preprocessor. Of course, the conditions are configured for evaluation by the source code preprocessor. Preferably, the conditions comprise a context-sensitive error message that identifies a variable that triggered the condition and an error type including at least an overlap error and an overflow error.

In certain embodiments, the apparatus may also include a memory region determination module, region condition generation module, and a region condition evaluation module. The memory region determination module may be configured to determine size and location information for custom memory regions defined at least in part by the hardcoded memory address symbols. The region condition generation module is configured to generate one or more region conditions that verify that the memory regions satisfy memory region capacity constraints based on the cumulative sizes of variables designating each custom memory region. The region condition evaluation module is configured to evaluate the region conditions and signal an error in response to violation of one of the region conditions.

The custom memory regions defined in the common resource may be referenced by source code and a link directive file used for linking the object code. The region condition generation module comprises a capacity calculation module configured to determine a region capacity for each region based on a size for the custom memory region. The region condition generation module also comprises a total module configured to total size information for each variable allocated to the custom memory region and a condition generator configured to generate a condition that compares total size information and region capacity for each custom memory region and a context-sensitive error message.

In one embodiment, the common resource includes values that define a custom memory region by a start address and a stop address. Alternatively, the custom memory region is defined by a start address and an offset or length. The custom memory region may be represented by a memory region symbol referenced both in the source code and in a link directive file provided to a linker that links the object code. The common resource may comprise a common definition file. In certain embodiments, the common definition file is includable within a source code file and a link directive file.

In another embodiment, an apparatus includes a source code preprocessor, a fixed address verification module, and a postprocessor. The source code preprocessor is configured to substitute a value for a placeholder. A mapping between values and placeholders is defined in a common definition file referenced both by a compiler of source code and a linker configured to link object code compiled from the source code. The fixed address verification module is configured to search size and location information for at least one variable associated with the placeholder and generate one or more conditions that verify that the variables satisfy memory boundary constraints based on the size and location information. The postprocessor is configured to send the conditions through the source code preprocessor for evaluation such that violation of one of the conditions signals an error.

A system according to the present invention may include a set of source code that includes one or more common header files comprising hardcoded memory address symbols that map to fixed memory address values. The hardcoded memory address symbols may be used by variables both in source code and in a link directive file. A preprocessor of the system may be configured to preprocess a suitably configured link directive file which references the common header files such that hardcoded memory address symbols in the common header files are replaced by fixed memory address values. The preprocessor may store the results in an intermediate file.

A fixed address verification module of the system may read the intermediate file, search size and location information in object files compiled from the source code for at least one variable associated with the hardcoded memory address symbols, generate one or more conditions that verify that the variable satisfies memory boundary constraints based on the size and location information, and store the one or more conditions in a revised link directive file. The revised link directive file may then be reprocessed using the preprocessor which evaluates the conditions such that violation of one of the conditions signals an error. The system may also include a compiler configured to compile the source code into assembly code and an assembler configured to assemble the assembly code into object code. A linker in the system may produce an image file by linking library files and the object code according to the revised link directive file.

A signal bearing medium of the present invention is also presented including machine-readable instructions configured to perform operations to identify fixed memory address errors in source code at build time. In one embodiment, the operations include an operation to substitute fixed memory address values for hardcoded memory address symbols. Another operation determines size and location information for variables associated with the hardcoded memory address symbols by referencing object code. One operation generates one or more conditions that verify that the variables satisfy memory boundary constraints based on the size and location information. Finally, an operation to evaluates the conditions and signals an error in response to violation of one of the conditions.

The present invention may be embodied in a utility program such as a fixed memory address validation utility. A user may define a single definition file comprising hardcoded memory address symbols that map to fixed memory address values. The hardcoded memory address symbols are referenced both in source code and in a link directive file. The user may then invoke the fixed memory address validation utility that substitutes fixed memory address values for hardcoded memory address symbols in the link directive file as indicated in the definition file and generates conditions configured to verify that variables associated with the fixed memory address values satisfy memory boundary constraints, the conditions readable by a software module of a source code build process. The user then invokes the source code build process that evaluates the conditions and notifies a user of an error in response to violation of one of the conditions.

The present invention also includes embodiments arranged as alternative methods, and apparatuses that comprise substantially the same functionality as the components and steps described above in relation to the apparatus, system, method and utility program. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of select embodiments of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
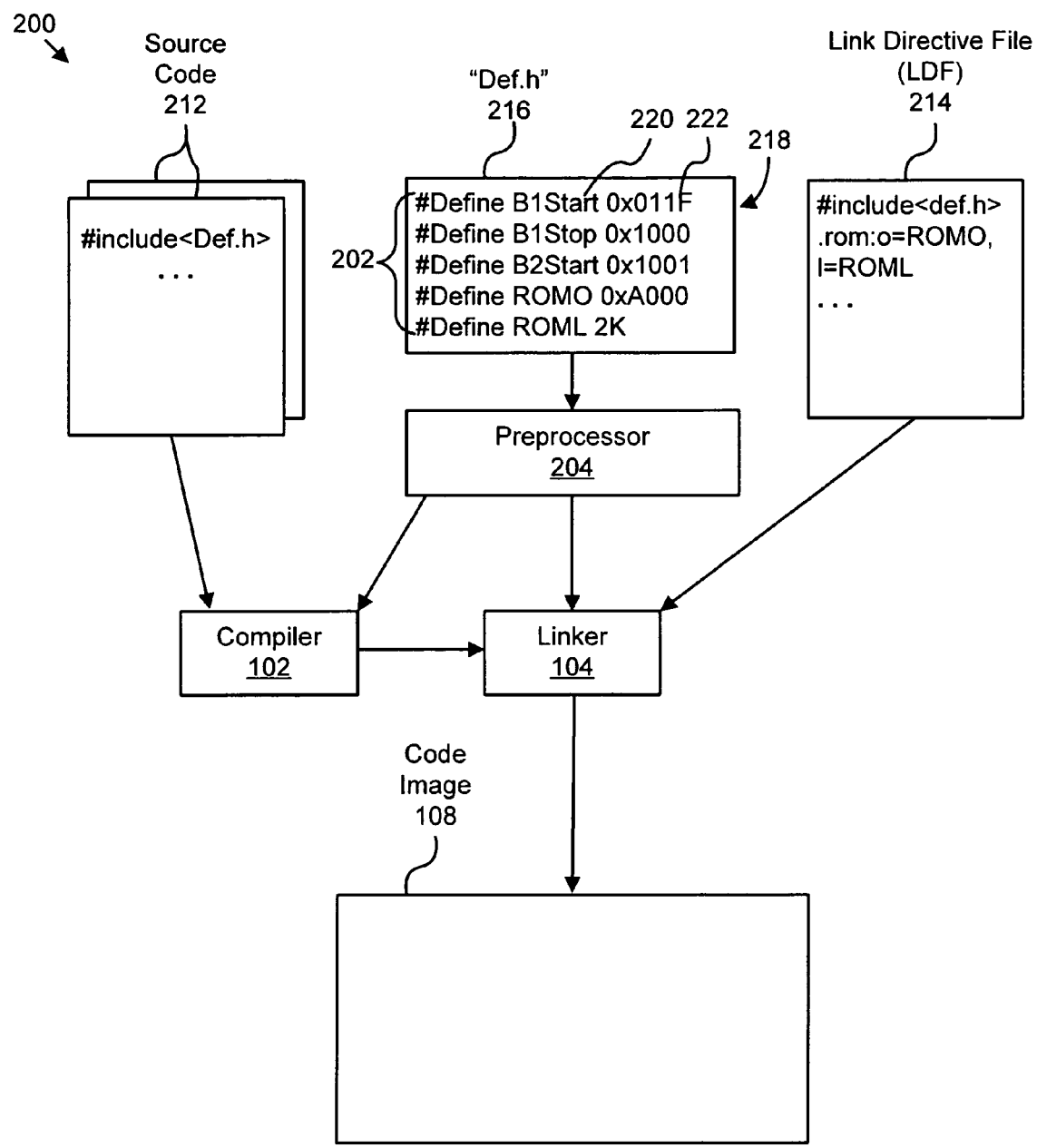
FIG. 2 is a logical block diagram illustrating a build process according to one embodiment of the present invention that identifies fixed memory address errors in source code at build time.

FIG. 2 illustrates a logical block diagram of an improved build process 200 that includes components and modules that may be organized to facilitate management of hardcoded memory address definitions 202. In particular, the hardcoded memory address definitions 202, typically stored in a text file, pass through a preprocessor 204 respectively with source code files 212 and with one or more link directive files 214. The preprocessor 204 modifies the source code files 212 and link directive file 214 respectively to include the hardcoded memory definitions 202. The modified source code file(s) 212 and link directive file(s) 214 are then used as input to a conventional compiler 102 and a conventional linker 104, respectively.

Unlike the conventional build process 100, the build process 200 according to one embodiment of the present invention consolidates all the hardcoded memory address definitions 202 into a common resource 216 (the resource name in FIG. 2 is "Def.h"). In certain embodiments, the common resource 216 comprises a common definition file. By consolidating the definitions 202, the likelihood of subtle errors in the definitions 202 is significantly reduced. Furthermore, changes to definitions 202 are managed in a single location which also reduces the potential for errors.

The common resource 216 may comprise one or more files. In one embodiment, the common resource 216 comprises one or more files having a .h extension compatible with a programming language such as C or C++. Preferably, the common resource 216 is formatted for compatibility with either the source code programming language or the format for a particular link directive file 214. The common resource 216 also includes instructions that allow the same definitions 202 to be used in both source code 212 and a link directive file 214 after the preprocessor 204 processes the definitions 202 with the source code 212 and link directive file 214, respectively.

For example, the definitions 202 may comprise a series of assignment instructions 218 that associate a symbol 220, also referred to as a hardcoded memory address symbol 220, with a fixed memory address value 222, typically in the form of a hexadecimal address. These assignment instructions 218 constitute a mapping between fixed memory address values 222 and hardcoded memory address symbols 220. The assignment instructions 218 are compatible with the preprocessor 204. The source code 212 and link directive file 214 are preferably drafted using hardcoded memory address symbols 220 in place of all fixed memory address values 222. Alternatively, the source code 212 and link directive file 214 may be revised to use just hardcoded memory address symbols 220. The hardcoded memory address symbol 220 facilitate programming by providing intuitive symbols to use in the source code instead of more ambiguous fixed memory address values 222 which represent constants in the source code 212.

In certain embodiments, the preprocessor 204 is a conventional preprocessor 204 normally used in conjunction source code 212 and a compiler 102 to produce assembly code. The preprocessor 204 takes one or more text files as input and processes instructions specific to the preprocessor 204 found in the text files. The preprocessor 204 instructions may be embedded in the source code 212 or grouped into a common resource 216 such as a .h file (i.e., "def.h"). The common resource 216 is includable in the source code 212 using a preprocessor 204 instruction (or directive) such as "#include <file name>." The "#include" instruction merges the referenced file, file name, into the source code file 212.

Typically, the preprocessor 204 operates as a macro replacement utility. The macros are defined by the assignment instructions 218 and define a symbol in source code 212 that is to be replaced by a value. In other words, the preprocessor 204 substitutes values for symbols in the source code 212.

The value may be any text including hexadecimal addresses, function or object definitions, and the like. In the present invention, the symbol constitutes a hardcoded memory address symbol 220 and the value constitutes a fixed memory address value 222. In this manner, variables defined as constants referenced throughout the source code 212 may be defined and changed in a single common location which reduces errors.

Preferably, the hardcoded memory address symbols 220 are intuitive and represent accepted names for identifying entry points, start points for data structures and memory regions, as well as sizes for data structures and/or memory regions. The same hardcoded memory address symbols 220 are preferably also used in the link directive file 214. The link directive file 214 may also include a preprocessor 204 instruction such as "#include <file name>." As mentioned above, the "#include" instruction merges the common resource 216 into the link directive file 214.

As a representative example, the common resource 216 defines a data structure, B1, that has a start address at the fixed memory address value 222 associated with hardcoded memory address symbol 220 "_B1start" and a stop address at the fixed memory address value 222 associated with hardcoded memory address symbol 220 "_B1end." A custom memory region, ROM, originates at the fixed memory address value 222 associated with hardcoded memory address symbol 220 "ROMO" and has a length of the fixed memory address value 222 associated with hardcoded memory address symbol 220 "ROML." Consequently, the custom memory region may be defined by a start address and a length or by a start address and a stop address. Thus, the fixed memory address value 222 may represent a specific address or a specific size of memory expressed in hexadecimal format.

It should also be noted that the hardcoded memory address symbol 220 "ROMO" and "ROML" are used in instructions in the link directive file 214 to define a custom memory region. Passing the link directive file 214 and common resource 216 through the preprocessor 204 substitutes the proper fixed memory address values 222 for the associated hardcoded memory address symbols 220. The revised link directive file having the proper fixed memory address values 222 is then passed to the linker 104 to build the code image 108. The same hardcoded memory address symbol 220, "ROMO," is referenced in a copy operation of the source code to copy the first eight bytes in ROMO to the destination. Passing the source code 212 and common resource 216 through the preprocessor 204 substitutes the proper fixed memory address value 222 for the associated hardcoded memory address symbol 220, "ROMO." Also of note, because representative data structure B2 is defined in the common resource 216 developers can readily ensure that data structure B2 starts after B1 ends.

Consequently, by using the same hardcoded memory address symbols 220 in the source code 212 and link directive file 214, a preprocessor 204 can substitute fixed memory address values 222 as defined in the common resource 216 to produce source code 212 and link directive files 214 that have consistent fixed memory address values 222. Errors are reduced because the mapping of hardcoded memory address symbols 220 to fixed memory address values 222 is defined in a single definition file.

Figure 1:
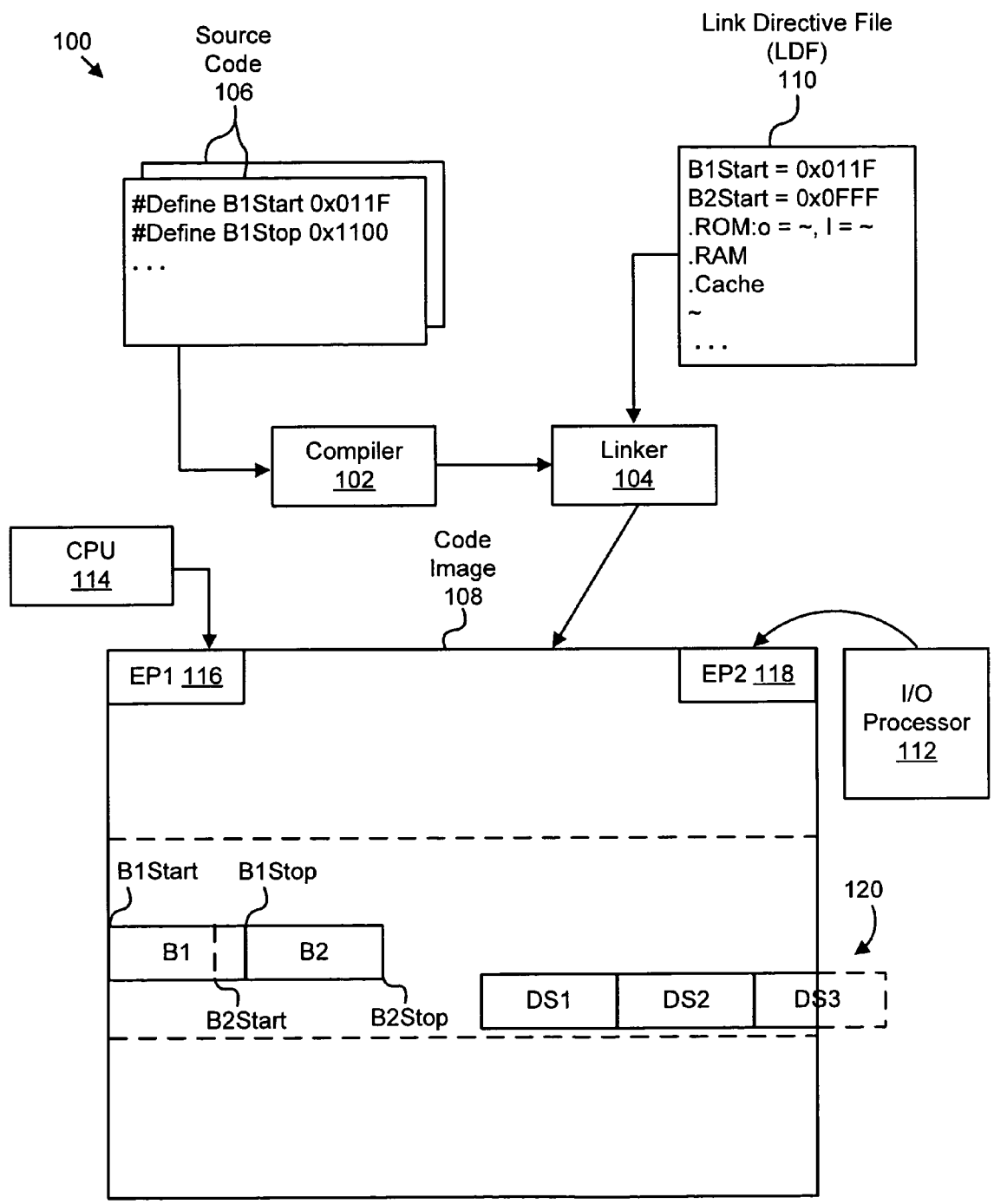
FIG. 1 is a block diagram illustrating a conventional software build process for an code image.
Figure 3:
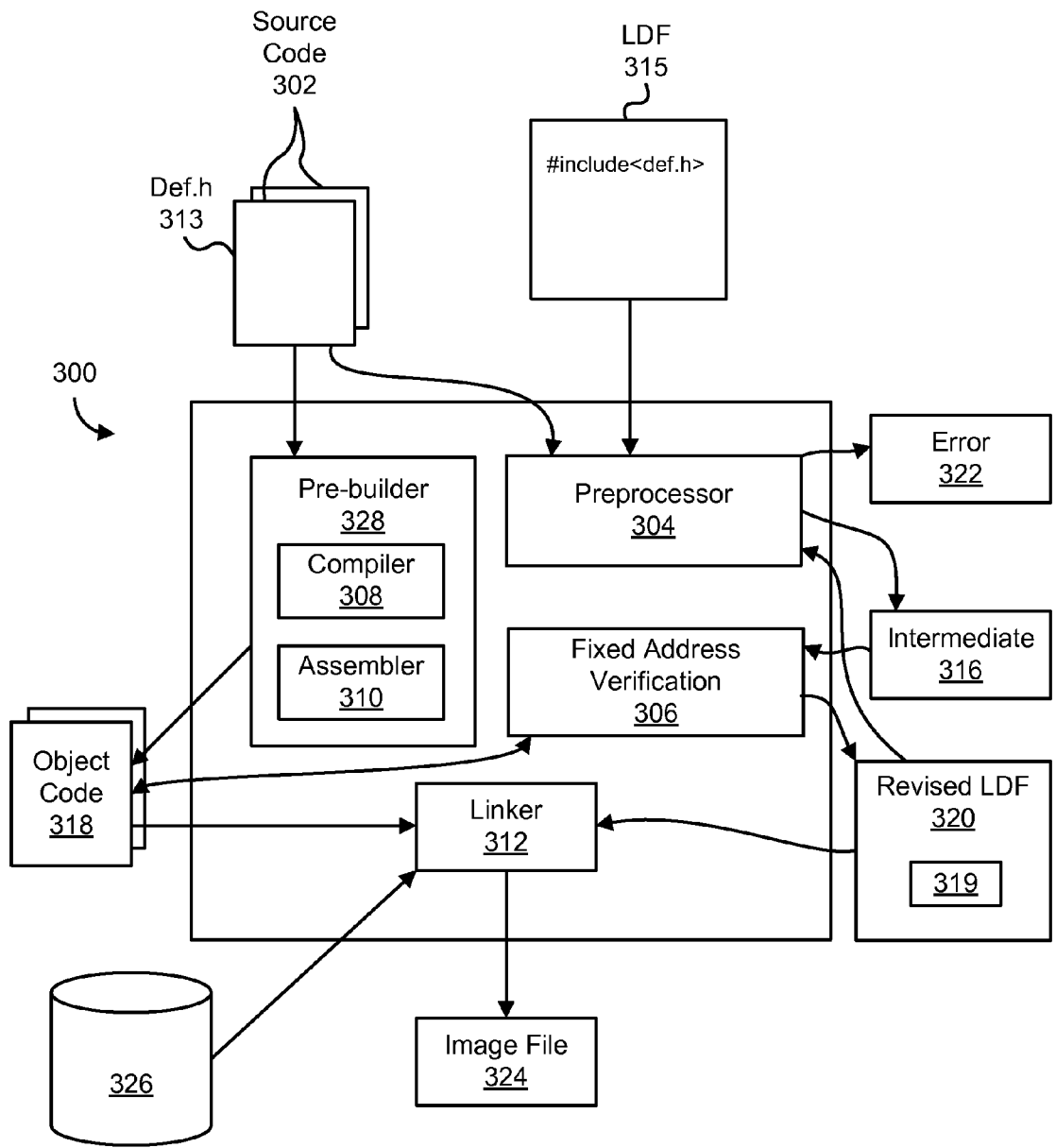
FIG. 3 is a schematic block diagram illustrating a representative system suitable for identifying fixed memory address errors in source code at build time in accordance with the present invention.

Referring now to FIG. 3, a system 300 for identifying fixed memory address errors in source code at build time is illustrated. The system 300 includes source code 302, a preprocessor 304, a fixed address verification module 306, a compiler 308, an assembler 310, and a linker 312. Preferably, the compiler 308, assembler 310, and linker 312 correspond to, and perform substantially the same functions as a conventional compiler 102, assembler (not illustrated in FIG. 1), and linker 104, illustrated and/or discussed in relation to FIG. 1.

The source code 302 preferably includes one or more common header files 313. The header files 313 include the hardcoded memory address definitions 202 discussed in relation to FIG. 2. The source code files 302 other than the header files 313 preferably references strictly hardcoded memory address symbols 220 rather than actual memory address values. The hardcoded memory address symbols 220 may be referenced directly using pointers. Alternatively, the hardcoded memory address symbols 220 are included in definition of other variables, objects, and data structures in the source code 302. Similarly, a link directive file 315 references the same hardcoded memory address symbols 220 either directly or indirectly through use of variables, objects, and data structures.

The preprocessor 304 is configured to preprocess the link directive file 315 which is configured to reference the header files 313. The preprocessor 304 performs substantially the same functions as the preprocessor 204 described in relation to FIG. 2. In one embodiment, the preprocessor 304 outputs an intermediate file 316. The intermediate file 316 comprises the link directive file 315 with hardcoded memory address symbols 220 replaced by fixed memory address values 222. Alternatively, the preprocessor 304 may stream output into the fixed address verification module 306.

Preferably, the fixed address verification module 306 reads in the intermediate file 316 which now includes the definitions from the header files 313. The fixed address verification module 306 references the object code 318 to identify variables associated with hardcoded memory address symbols 220. Alternatively, the fixed address verification module 306 may parse the header files 313 to identify variables associated with hardcoded memory address symbols 220. Once variables are identified, the fixed address verification module 306 searches precompiled and assembled object code 318, also known as object files 318, for size and location information for the variables.

The object code typically includes three types of data: a Block Started By Symbol (bss) segment, a text segment, and a data segment. The bss segment includes symbols that require reserved amounts of memory but the memory is not initialized to specific values. The text segment comprises the machine instructions that make up the software program. The data segment holds variables that are initialized to specific values. Preferably, the fixed address verification module 306 references a symbol table, produced by the compiler, to identify the variables to be searched. In certain embodiments, the fixed address verification module 306 may determine the size and location information for a subset of the symbols, variables, found in the symbol table.

In one embodiment, the fixed address verification module 306 determines the size and location of variables that are associated with hardcoded memory address symbols 220 in the link directive file 315. Alternatively, the fixed address verification module 306 may determine size and location information for all defined variables.

The fixed address verification module 306 uses the variable size and location information to generate one or more conditions 319 to verify that the variable satisfies memory boundary constraints. A memory boundary constraint is a requirement that no variable start, stop, or extend in to memory addresses assigned to other variables.

Depending on how the memory sections are defined for the system, the fixed address verification module 306 may generate simple or complex conditions 319. In one embodiment, the variables may be organized such that one variable will follow the last variable serially in memory. Consequently, for each variable, the fixed address verification module 306 may generate a simple condition 319 that ensures that this variable does not begin at an earlier address in memory than the last variable ended.

The condition 319 verifies that the boundaries of one variable are respected by those of another variable. For example, a data structure, DS1, coded by developer A may be defined with a start address of 0×2000 and a stop address of 0×4000. However, developer B who is working on the same system, but knows nothing about developer A's data structure, DS1, may define a data structure, DS2, that violates the boundaries of DS1. DS2 may have a stop address of 0×8000 but a start address of 0×3000. Conventionally, such an error was undetected until the software was executed and DS1 or DS2 corrupted each other or developer A talked to developer B.

Preferably, the conditions 319 are stored as instructions that are executable by a module in the build process 200. In one embodiment, the instructions comprise executable instructions for the source code preprocessor 304. For example, the instructions may comprise "#error text-expression" statements. The text-expression may include an intuitive, context-sensitive, message and debugging information. The debugging information may identify the variable involved in the condition 319 as well as the error type identified. The error type may be one of an overlap error or an overflow error.

In one embodiment, the fixed address verification module 306 stores the conditions 319 in a revised link directive file 320. Alternatively, the conditions 319 may be written to a separate file such as a header file that is included within the original LDF 315 to produce the revised link directive file 320. The revised link directive file 320 may include all the original instructions of the link directive file 315 with the addition substitutions made by the preprocessor 304 to create the intermediate file 316 and the addition of the conditions 319. The fixed address verification module 306 may pass the revised link directive file 320 to the preprocessor 304 for evaluation of the conditions 319.

The preprocessor 304 evaluates the conditions 319. If a condition 319 is violated, the preprocessor 304 signals an error 322. The preprocessor 304 may display an intuitive, context-sensitive, message and debugging information using a user interface (not show) for the preprocessor 304. Alternatively, the preprocessor 304 may write the message and debugging information to an error file. In certain embodiments, the preprocessor 304 optionally stops processing once an error 322 is encountered. Alternatively, the preprocessor 304 continues processing until the whole revised link directive file 320 is processed.

If the preprocessor 304 evaluates the conditions 319 and no errors 322 are found, the system 300 may continue with the build process 200 by invoking the linker 312 with the revised link directive file 320, object code 318, and library files 326 as inputs. In certain embodiments, the linker 312 may include logic for confirming that variables designating that they be positioned within a custom memory region do actually fit within the particular custom memory region. The linker 312 produces the image file 324 that is substantially free from hardcoded memory address errors.

Preferably, the system 300 also includes a pre-builder 328. The pre-builder 328 invokes the compiler 308 and assembler 310 to produce the object code 318 from the source code 302. Typically, the pre-builder 328 also uses the header files 313. Preferably, the compiler 308 and assembler 310 are invoked without invoking the linker 312. As mentioned above, the fixed address verification module 306 references the object code 318. Consequently, the pre-builder 328 is preferably invoked prior to the initiation of the preprocessor 304 that builds the intermediate file 316. Preferably, the pre-builder 328 is invoked by a user/programmer if the source code 302 has been changed.

Figure 4:
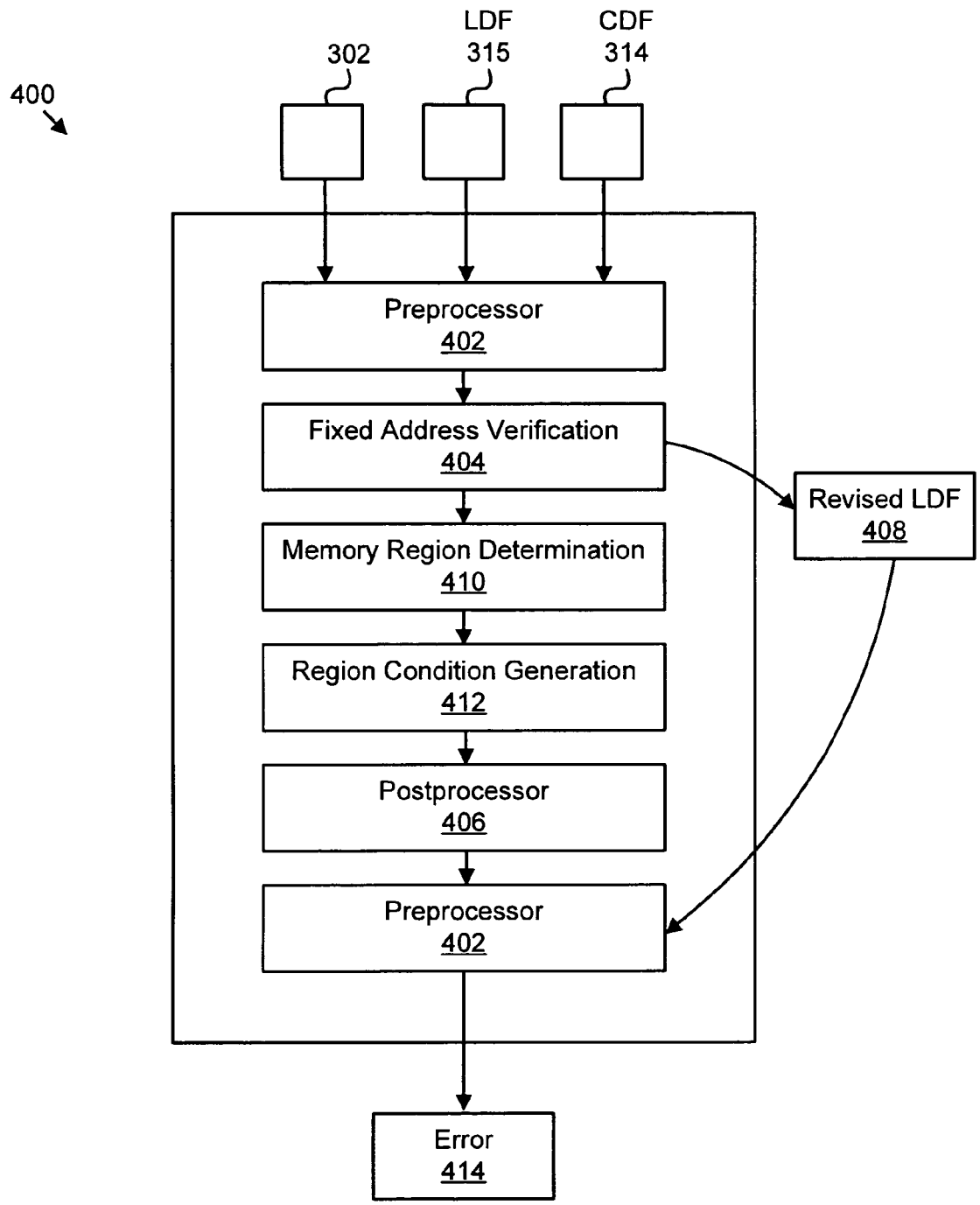
FIG. 4 is a schematic block diagram illustrating a representative apparatus suitable for implementing certain embodiments of the present invention.

FIG. 4 illustrates an apparatus 400 for identifying fixed memory address errors in source code at build time. FIG. 4 also illustrates the data flow of a build process 200 (See FIG. 2) in accordance with the present invention. The apparatus 400 includes a source code preprocessor 402, a fixed address verification module 404, and a postprocessor 406.

In one embodiment, the source code preprocessor 402 includes substantially the same functionality as the preprocessor 304 described in relation to FIG. 3. The source code preprocessor 402 substitutes values for placeholders. The values typically comprise fixed memory address values. The placeholders may comprise hardcoded memory address symbols. Of course the preprocessor 304 may make other substitutions as well.

The source code 302 and the Link Directive File (LDF) 315 include the placeholders. The Common Definition File (CDF) 314 also known as the header file 313 and common resource in certain embodiments includes a mapping of values to placeholders. The fixed address verification module 404 processes the intermediate file 316 and references object code 318 (See FIG. 3) to generate the revised LDF 408 in substantially the same manner as the fixed address verification module 306 discussed in relation to FIG. 3.

The apparatus 400 may also include a memory region determination module 410 and a region condition generation module 412. The memory region determination module 410 and region condition generation module 412 cooperate to manage custom defined memory regions having fixed memory address values. These custom memory regions may have fixed memory address values so that developers can utilize parts of memory having particular characteristics such as speed, caching, and the like.

In certain software systems, such as embedded systems, it may be desirable to designate certain portions of memory for a particular purpose. For example, in certain embedded systems, a plurality of control modules (also known as masters) should have access to the same data structure. The data structure may comprise for example a state structure that includes different attributes regarding the state of the overall embedded system. Examples of control modules include a Central Processing Unit (CPU), a service processor, a plurality of Peripheral Component Interconnect (PCI) masters, and the like.

Typically, to facilitate development efforts between various vendors that may be responsible for programming the different control modules, the data structure is positioned in memory at a fixed memory address. Furthermore, performance requirements may require that the data structure be positioned within a particular type of memory such as high-speed cached memory. The particular type of memory is defined in the LDF 315 as a memory region also known as a custom memory region. In one embodiment, the LDF 315 includes linker directives such as "Memory {Expression(s)}" and "Sections {Expression(s)}" that respectively, define custom memory regions and designate how the memory regions are organized. The custom memory region may be referenced in both the LDF 315 and source code 302 using a memory region symbol or variable.

Preferably, the size and location information for the custom memory region are defined in the CDF 314. In one embodiment, the CDF 314 provides hardcoded values for the start address and stop address for the custom memory region. Alternatively, the CDF 314 may include hardcoded values that define a start address and a length or offset to define a custom memory region.

In addition, developers may need to allocate or designate that certain variables be positioned within custom memory regions. Compiler instructions (i.e., "#pragma expression") in the source code 302 designate variables that are to be positioned within a custom memory region. The size information for the variables designated within a custom memory region are defined in the source code 302 that was precompiled. Preferably, source code defining and instantiating these variables is consolidated into a single source code file 302 that is precompiled before the preprocessor 402 processes the LDF 315.

The memory region determination module 410 references the LDF 315 to determine the size and location information for each of the memory regions, typically, both standard and custom memory regions. In particular, size and location information is determined for memory regions defined by hardcoded memory address symbols 220. The memory region determination module 410 provides the size and location information to the region condition generation module 412.

The region condition generation module 412 generates one or more region conditions that verify that a particular memory region satisfies memory region capacity constraints. In particular, the region condition generation module 412 determines the cumulative sizes of variables that are to be positioned within a custom memory region. Certain region conditions may also verify that non-custom memory regions of a fixed size do not overflow due to variable allocations.

A memory region capacity constraint is a requirement that data structures placed within a memory region do not have a combined size that exceeds the overall size or capacity of the memory region. Typically, the programmers define a plurality of variables assigned to data structures of various sizes that are to be located within the custom memory regions. However, coordinating the sizes and numbers of data structures within a single memory region may be very difficult, particularly between programmers at different embedded system development sites. Conventionally, this resulted in custom memory regions in which the number and size of data structures allocated to the custom memory region exceeded the size of the custom memory region. This is referred to herein as a memory overflow error. Memory overflow errors are typically not revealed until the executable code is tested and/or deployed and can be very difficult to diagnose.

The apparatus 400 avoids this problem because the region conditions are inserted or linked to the LDF 315 to form a revised LDF 320 in a similar manner as the conditions 319 discussed above. The region conditions are configured for evaluation by the source code preprocessor 402.

In one embodiment, the postprocessor 406 sends the conditions 319 through the preprocessor 402 once again. Typically, the postprocessor 406 invokes the preprocessor 402 with the revised LDF 320 as input. As explained above, if one of the conditions 319 is violated, the preprocessor 402 may signal an error 414. Typically, the error reporting process in the apparatus 400 operations in substantially the same manner as the error reporting 322 described in relation to FIG. 3.

In certain embodiments, where the revised LDF 320 includes the conditions 319 and the region conditions, if either a condition 319 or a region condition is violated an error 414 is signaled. Advantageously, this permits programmers to identify either memory overlap errors or memory overflow errors during the build process 200 instead of during testing or deployment. Errors identified during the build process 200 can be more readily debugged and resolved, particularly in embodiments where the errors messages are context-sensitive.

Alternatively, the memory region determination module 410 and region condition generation module 412 are configured to check the source code for memory overflow errors dynamically. For example, the memory region determination module 410 may compute a maximum size for a custom memory region. The memory region determination module 410 and/or region condition generation module 412 may then scan a symbol table in the object files 318 to determine a running total size for variables allocating the custom memory region. If the running total exceeds the maximum size, the region condition generation module 412 or memory region determination module 410 may signal the memory overflow error. Of course, the region condition generation module 412 and memory region determination module 410 may manage a plurality of custom memory regions during a single scan of the symbol table.

Figure 5:
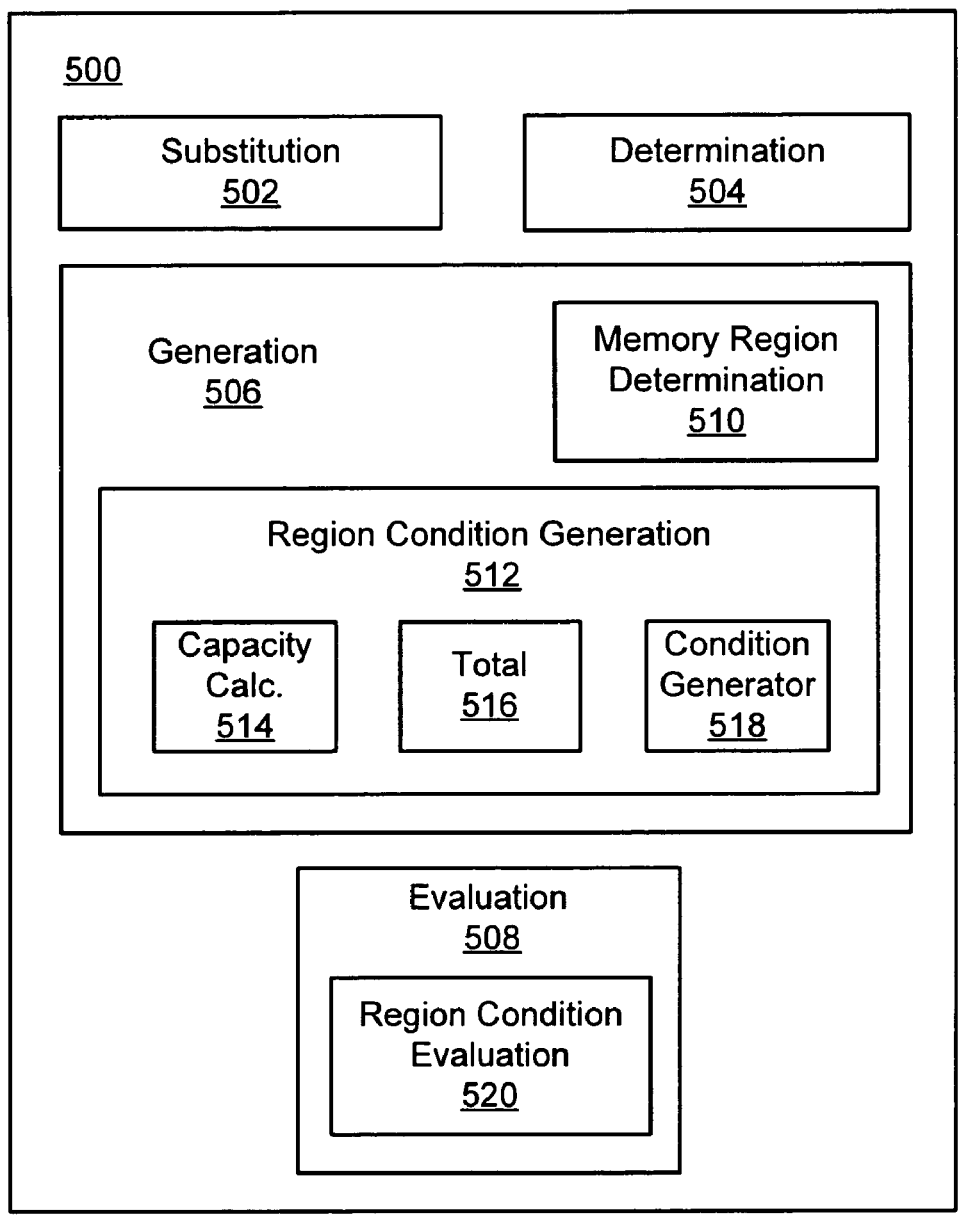
FIG. 5 is a schematic block diagram illustrating another representative apparatus suitable for implementing certain embodiments of the present invention.

FIG. 5 illustrates an alternative embodiment of an apparatus 500 for identifying fixed memory address errors in source code at build time. In the system 300 and apparatus 400 described respectively in relation to FIGS. 3 and 4, the files 302, 314, 315, 316, and 320 are configured to utilize conventional tools such as a source code preprocessor 304, compiler 308, assembler 310, and linker 312 in a novel way to facilitate implementing the present invention. The apparatus 500 includes alternative arrangements of the logic modules described in the system 300 and apparatus 400.

The apparatus 500 includes a substitution module 502, a determination module 504, a generation module 506, and an evaluation module 508. The substitution module 502 substitutes fixed memory address values 222 (See FIG. 2) for the associated hardcoded memory address symbols 220 in substantially the same manner as the preprocessor 204. However, the substitution module 502 may comprise a module separate and distinct from conventional source code preprocessors 204.

The determination module 504 determines size and location information for variables associated with the hardcoded memory address symbols in substantially the same manner as the fixed address verification module 306 (See FIG. 3). The generation module 506 generates one or more conditions 319 that verify memory boundary constraints in substantially the same manner as the fixed address verification module 306 (See FIG. 3). However, the determination module 504 and generation module 506 may be separate modules. Consequently, these separate modules 504, 506 may operate independently or may be integrated with other build process utilities such as a compiler 308, an assembler 310, a linker 312, an Integrated Development Environment (IDE), or the like.

In certain embodiments, the generation module 506 includes a memory region determination module 510 and a region condition generation module 512 that function in substantially the same manner as the memory region determination module 410 and a region condition generation module 412 described in relation to FIG. 4.

In one embodiment, the region condition generation module 512 includes a capacity calculation module 514, total module 516, and condition generator 518. The capacity calculation module 514 determines the region capacity for a custom region. Typically, the region capacity comprises a length indicator set forth in the definition of the custom region in the LDF 315. For example, the LDF 315 may define a custom region named "message" with a length of two-hundred and fifty-six bytes. The length indicator corresponds to the size of the custom region. Alternatively, the capacity calculation module 514 may compute the size by finding a difference between a start offset and a stop offset for the custom region.

The total module 516 adds up the size information for each variable that the object code 318 indicates is positioned within a custom memory region. The total module 516 may reference the .bss and .data segments of the object code 318 to make this determination. In reference to the example above, the total module 516 searches the object code 318 and may find five data structures defined to be positioned or allocated within the "MESSAGE" custom region. The total module 516 may total the sizes of the five data structures and determine that the combined size is two-hundred and eighty bytes.

The condition generator 518 generates a region condition that includes the region capacity and the total size of variables allocated to the custom region as provided by the total module 516. Typically, the region condition (and the memory address condition 319 discussed above) is a conditional statement using operators such as <, >, <=, >=, and <>. Preferably, the condition generator 518 also generates a context-sensitive message. As mentioned above, the condition generator 518, in certain embodiments, may dynamically evaluate the region condition and signal an error as appropriate.

An example region condition may be "#error 280 >256 'Memory overflow error in custom memory region MESSAGE'." The values 280 and 256 for the condition are provided by the capacity calculation module 514 and total module 516, respectively. In this example, the region condition would evaluate to true indicating an error condition. The context-sensitive message, 'Memory overflow error in custom memory region 'message,'" provides a clear indication of the problem and where a developer can look to resolve the error.

The evaluation module 508 is invoked to evaluate both memory address conditions 319 and region conditions. As discussed above, the evaluation module 508 may be embodied as a source code preprocessor 304, 402. In certain embodiments, the memory address conditions 319 and region conditions are so different that the evaluation module 508 includes a region condition evaluation module 520 that evaluates the region conditions.

Figure 6:
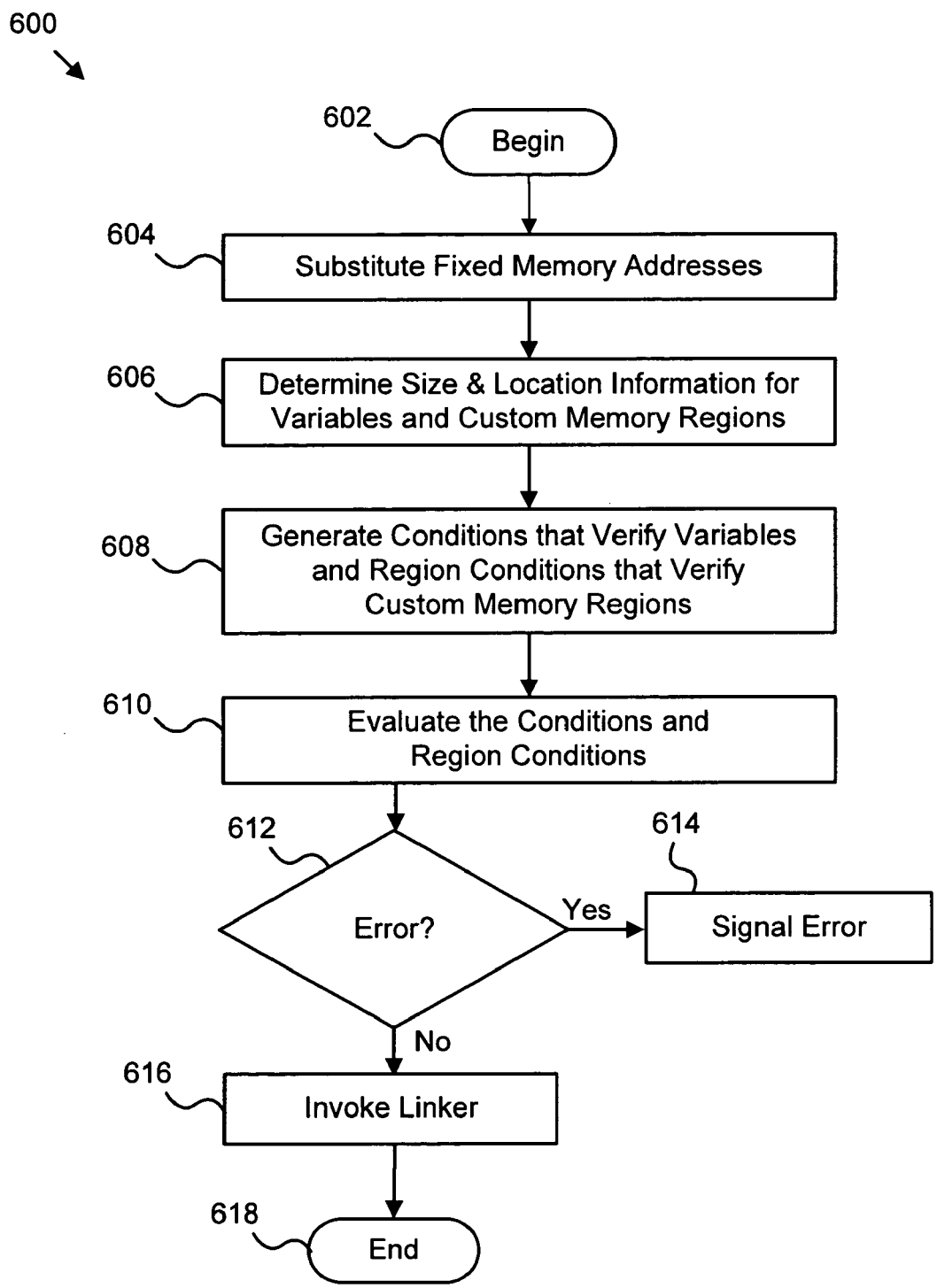
FIG. 6 is a schematic flow chart diagram illustrating a method for identifying fixed memory address errors in source code at build time.

FIG. 6 illustrates a flow chart of a method 600 for identifying fixed memory address errors in source code at build time according to one embodiment. In particular, the method 600 illustrates one way to process an LDF 315 and identify fixed memory address errors. The method 600 begins 602 once a programmer desires to verify that hardcoded memory addresses are accurate for a target hardware memory platform. Alternatively, the method 600 may begin 602 once development of software is stopped and testing or deployment is begun. To begin 602 the process 600, a programmer compiles all the source code 302 into object code 318 but does not initiate the linker 312.

Next, the preprocessor 304 may substitute 604 fixed memory address values 222 for hardcoded memory address symbols 220. Alternatively, a substitution module 502 may perform the substitution 604. Preferably, the hardcoded memory address symbols 220 are common between source code 302 and a link definition file 315. The preprocessor 304 may perform the substitutions in the source code 302 and in the link definition file 315. The link definition file 315, or a file incorporated therein, is modified to include the fixed memory address values 222.

Next, a determination module 504 determines 606 size and location information for variables and custom memory regions defined for both the source code 302 and the LDF 315. The generation module 506 generates 608 conditions 319 to verify variables that are defined by fixed memory address values 222. In certain embodiments, the generation module 506 also generates 608 region conditions to verify custom memory regions defined by fixed memory address values 222.

In one embodiment, an evaluation module 508 evaluates the conditions 319 and region conditions. Preferably, the evaluation module 508 is embodied as a source code preprocessor 304. Next, a determination 612 is made as to whether a condition 319 or region condition is violated, If so, an error 322 is reported 614 to a programmer or stored for future reference. Consequently, the evaluation step 610 allows the programmer to identify fixed memory address errors before the executable image 324 is completely built and deployed.

If no conditions 319 or region conditions are violated, the evaluation module 508 may invoke 616 the linker 312. Alternatively, the linker 312 is invoked manually. The method 600 then ends 618.

Figure 7:
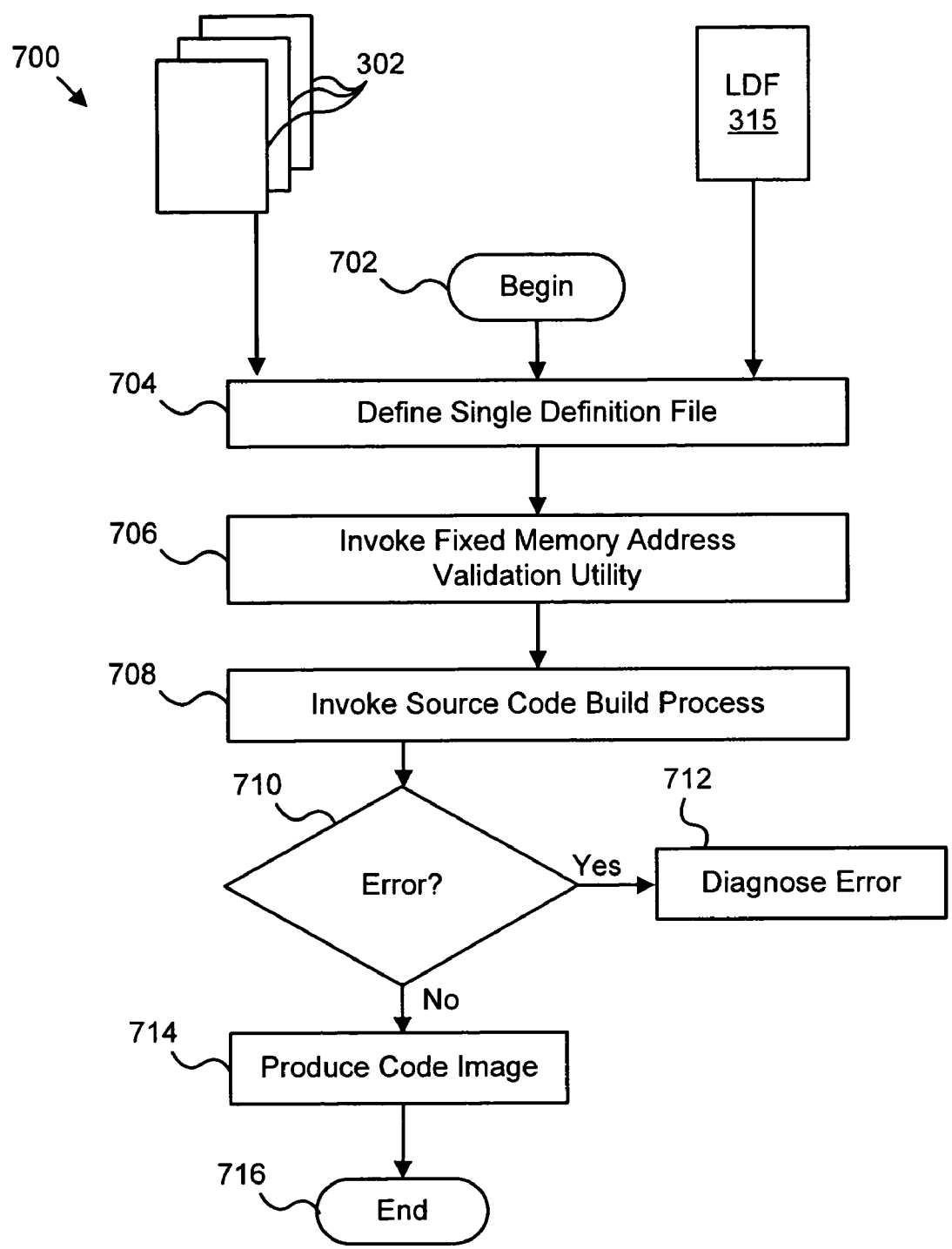
FIG. 7 is a schematic flow chart diagram illustrating a method for identifying fixed memory address errors in source code at build time using a fixed address validation utility.

FIG. 7 illustrates a method 700 of using a fixed memory address validation utility to identify fixed memory address errors in source code at build time. The method 700 may be performed by a programmer or developer, referred to as the end-user, within an entity producing the software. Alternatively, the method 700 may be performed by a consultant or entity servicing a client as a consultant, referred to as a service provider. Such that the service provider implementing the method 700 provides the service of identifying fixed memory address errors in source code at build time for a client. Of course the service provider may perform additional services as well.

The method 700 begins 702 once the service provider is engaged to identify fixed memory address errors in source code at build time. To begin 702, the service provider may pre-build the end-user's (client's) source code 302 by compiling the source code 302 to produce object code 318 without generating an executable image.

Next, a single CDF 314 is defined 704, typically by the service provider. The service provider may manually review both the source code 302 and the LDF 315 to identify fixed memory address values 222 and define hardcoded memory address symbols 220 that are referenced in both the source code 302 and the LDF 315. Optionally, the service provider may modify the source code 302 and/or LDF 315 to include more hardcoded memory address symbols 220 instead of fixed memory address values 222.

Alternatively, the service provider may extract variable definitions that reference fixed memory address files for predefined header files using automated tools. The service provider may also selectively replace fixed memory address values 222 and define hardcoded memory address symbols 220 manually or with the aide of automated tools.

Next, the service provider invokes 706 a fixed memory address validation utility. Preferably, the fixed memory address validation utility performs substantially the same functions as the fixed address verification module 306 described above in relation to FIG. 3. Consequently, the fixed memory address validation utility performs the substitutions and generates the conditions 319 and region conditions discussed above.

The service provider, or optionally the end-user, may then invoke 708 a source code build process provided that the source code build process includes the evaluation for the conditions 319 and region conditions. In one embodiment, the source code build process includes invoking a linker 312 that references preassembled object code 318 and a LDF 315 that includes the conditions 319 and/or region conditions.

The source code build process evaluates the conditions 319 and/or region conditions to determine 710 if there are fixed memory addresses errors such as overlap errors and/or overflow errors. If errors are found, the service provider may diagnose the error 712 and optionally correct the error. If no errors are found, the source code build process produces 714 the code image file 324 and the method 700 ends 716.

In certain embodiments, the service provider may also teach the end user how to configure the source code 302, LDF 315, define the single CDF 314, and/or use the fixed memory address validation utility. For example, the service provider may instruct the end-user how to define the single definition file to define values and variable definitions that are compatible with both the C programming language source files 302 and a LDF 315. Of course, the service provider may also instruct the end-user how to define custom memory regions that are compatible with both C programming language source files 302 and the LDF 315.

Those of skill in the art will readily recognize the benefits of the present invention. Specifically, with the present invention fixed memory address errors are identified at build time instead of during testing or deployment. The present invention automatically generates conditions which check for memory overlap errors and memory overflow errors. Furthermore, using a common resource such as a single definition file reduces the chances that incorrect fixed memory address values will be used because newly added fixed memory address values can be readily checked against existing fixed memory address values in the same definition file.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

What is claimed is:

1. An apparatus for identifying fixed memory address errors in source code at build time, the apparatus comprising:
   a substitution module comprising executable code stored on a storage device, executed by a processor, and configured to substitute fixed memory address values for hardcoded memory address symbols, a mapping between fixed memory address values and hardcoded memory address symbols defined in a common definition file (CDF) referenced both by a compiler of source code and a linker configured to link object code compiled from the source code;
   a determination module comprising executable code stored on the storage device, executed by the processor, and configured to determine size and location information for variables associated with the hardcoded memory address symbols by referencing the object code and the CDF, substitute the hardcoded memory address symbols with the fixed memory address values, and store the substituted fixed memory address values in an intermediate file;

a generation module comprising executable code stored on the storage device, executed by the processor, and configured to generate one or more conditions that verify that the variables satisfy memory boundary constraints based on the size and location information and store the conditions and the substituted fixed memory address values in a revised link directive file; and an evaluation module comprising executable code stored on the storage device, executed by the processor, and configured to preprocess the revised link directive file and signal an error in response to violation of one of the conditions.

2. The apparatus of claim 1, further comprising, a memory region determination module comprising executable code stored on the storage device, executed by the processor, and configured to determine size and location information for custom memory regions defined at least in part by the hardcoded memory address symbols;

a region condition generation module comprising executable code stored on the storage device, executed by the processor, and configured to generate one or more region conditions that verify that the memory regions satisfy memory region capacity constraints based on the cumulative sizes of variables designating each custom memory region; and a region condition evaluation module comprising executable code stored on the storage device, executed by the processor, and configured to evaluate the region conditions and signal an error in response to violation of one of the region conditions.

3. The apparatus of claim 2, wherein the custom memory regions defined in the CDF are referenced by source code and a link directive file used for linking the object code.

4. The apparatus of claim 2, wherein the region condition generation module comprises a capacity calculation module comprising executable code stored on the storage device, executed by the processor, and configured to determine a region capacity for each region based on a size for the custom memory region, a total module comprising executable code stored on the storage device, executed by the processor, and configured to calculate total size information for each variable allocated to the custom memory region, and a condition generator comprising executable code stored on the storage device, executed by the processor, and configured to generate a condition that compares total size information and region capacity for each custom memory region and a context-sensitive error message.

5. The apparatus of claim 1, wherein the evaluation module comprises logic within a source code preprocessor, the conditions configured for evaluation by the source code preprocessor.

6. The apparatus of claim 1, wherein the conditions comprise a context-sensitive error message that identifies a variable and an error type.

7. The apparatus of claim 6, wherein the error type comprises an overlap error and an overflow error.

8. The apparatus of claim 1, wherein the CDF further comprises values that define a custom memory region by a start address and a stop address, the custom memory region represented by a memory region symbol referenced both in the source code and in the revised link directive file provided to a linker that links the object code.

9. The apparatus of claim 1, wherein the CDF is includable within the source code and the link directive file.

10. An apparatus for identifying fixed memory address errors in source code at build time, the apparatus comprising:

a source code preprocessor comprising executable code stored on a storage device, executed by a processor, and configured to substitute a fixed memory address value for a hardcoded memory address symbol, a mapping between fixed memory address values and hardcoded memory address symbols defined in a CDF referenced both by a compiler of source code and a linker configured to link object code compiled from the source code;

a fixed address verification module comprising executable code stored on the storage device, executed by the processor, and configured to search size and location information for at least one variable associated with the hardcoded memory address symbol by referencing the object code and the CDF, substitute the hardcoded memory address symbols with the fixed memory address values, store the substituted fixed memory address values in an intermediate file, generate one or more conditions that verify that the at least one variable satisfies memory boundary constraints based on the size and location information, and store the conditions and the substituted fixed memory address values in a revised link directive file; and a postprocessor comprising executable code stored on the storage device, executed by the processor, and configured to preprocess the revised link directive file such that violation of one of the conditions signals an error.

11. The apparatus of claim 10, wherein the common definition file includes a definition for a custom memory region, the apparatus further comprising, a memory region determination module comprising executable code stored on the storage device, executed by the processor, and configured to determine size and location information for the custom memory region defined at least in part by the placeholder;

a region condition generation module comprising executable code stored on the storage device, executed by the processor, and configured to generate one or more region conditions that verify that the memory region satisfies memory region capacity constraints based on the cumulative sizes of variables designating the custom memory region; and wherein the region conditions are configured for evaluation by the source code preprocessor such that violation of one of the region conditions signals an error.

12. The apparatus of claim 11, wherein the custom memory region is referenced by the source code file and the link directive file.

13. The apparatus of claim 12, wherein the custom memory region is defined by a start address and a length, the custom memory region represented by a memory region symbol referenced both in the source code and in the revised link directive file provided to the linker.

14. A system to identify fixed memory address errors in source code at build time, comprising:

a set of source code that includes a CDF referenced both by a compiler of source code and a linker configured to link object code compiled from the source code comprising hardcoded memory address symbols that map to fixed memory address values, the hardcoded memory address symbols used by variables both in source code and in a link directive file;

a preprocessor comprising executable code stored on a storage device, executed by a processor, and configured to preprocess the link directive file which references the CDF files such that hardcoded memory address symbols in the CDF files are substituted with fixed memory address values and to store the substituted fixed memory address values in an intermediate file;

a fixed address verification module comprising executable code stored on the storage device, executed by the processor, and configured to, read the intermediate file, search size and location information in the object codefiles compiled from the source code for at least one variable associated with the hardcoded memory address symbols, generate one or more conditions that verify that the variable satisfies memory boundary constraints based on the size and location information, and store the one or more conditions and substituted fixed memory address values in a revised link directive file;

the preprocessor further configured to reprocess the revised link directive file and evaluate the conditions such that violation of one of the conditions signals an error;

the compiler comprising executable code stored on the storage device, executed by the processor, and configured to compile the source code into assembly code;

an assembler comprising executable code stored on the storage device, executed by the processor, and configured to assemble the assembly code into object code;

the linker comprising executable code stored on the storage device, executed by the processor, and configured to produce an image file by linking library files and the object code according to the revised link directive file.

15. The system of claim 14, wherein the linker is configured to signal overflow of custom memory regions defined in the CDF.

16. The system of claim 14, further comprising a prebuilder comprising executable code stored on the storage device, executed by the processor, and configured to invoke the compiler and assembler to produce the object code from the set of source code without invoking the linker, the object code referenced by the fixed address verification module.

17. A executable code stored on a storage device and executed by a processor to perform operations to identify fixed memory address errors in source code at build time, the operations comprising:

an operation to substitute fixed memory address values for hardcoded memory address symbols, a mapping between the fixed memory address values and the hardcoded memory address symbols defined in a CDF referenced both by a compiler of source code and a linker configured to link object code compiled from the source code;

an operation to determine size and location information for variables associated with the hardcoded memory address symbols by referencing the object code and the CDF:

an operation to substitute the hardcoded memory address symbols with the fixed memory address values:

and operation to store the substituted fixed memory address values in an intermediate file;

an operation to generate one or more conditions that verify that the variables satisfy memory boundary constraints based on the size and location information; and an operation to store the conditions and the substituted fixed memory address values in a revised link directive file:

an operation to preprocess the revised link directive file: and an operation to signal an error in response to violation of one of the conditions.

18. The program of claim 17, further comprising, an operation to determine size and location information for custom memory regions defined at least in part by the hardcoded memory address symbols;

an operation to generate one or more region conditions that verify that the custom memory regions satisfy memory region capacity constraints based on the cumulative sizes of variables designating each custom memory region; and an operation to evaluate the region conditions and signaling an error in response to violation of one of the region conditions.

19. The program of claim 18, wherein the custom memory regions are defined in the CDF.

20. The program of claim 18, wherein the operation to generate one or more region conditions further comprises an operation to determine a region capacity for each region based on a size for the custom memory region, an operation to calculate total size information for each variable allocated to the custom memory region, and an operation to generate a condition that compares total size information and region capacity for each custom memory region and a context-sensitive error message.

21. The program medium of claim 17, wherein a source code preprocessor preprocesses the revised link directive file.

22. The program of claim 17, wherein the conditions comprise a context-sensitive error message that identifies a variable and an error type.

23. The program of claim 22, wherein the error type comprises an overlap error and an overflow error.

24. The program of claim 17, wherein the hardcoded memory address symbols further comprise a custom memory region defined by values that designated a start address and a stop address, the custom memory region represented by a memory region symbol referenced both in the source code and in the link directive file.

25. The program of claim 19, wherein the operation to substitute fixed memory address values comprises an operation to combine the definitions of the hardcoded memory address symbols with the revised link directive file.

26. A method for identifying fixed memory address errors in source code at build time, the method performed by executable code stored on a storage device, executed by a processor, and comprising:

substituting fixed memory address values for hardcoded memory address symbols, a mapping between the fixed memory address values and the hardcoded memory address symbols defined in a CDF referenced both by a compiler of source code and a linker configured to link object code compiled from the source code;

determining size and location information for variables associated with the hardcoded memory address symbols by referencing the object code and the CDF;

substituting the hardcoded memory address symbols with the fixed memory address values:

storing the substituted fixed memory address values in an intermediate file;

generating one or more conditions that verify that the variables satisfy memory boundary constraints based on the size and location information; and storing the conditions and the substituted fixed memory address values in a revised link directive file:

preprocess sing the revised link directive file evaluating the conditions; and signaling an error in response to violation of one of the conditions.

27. The method of claim 26, further comprising, determining size and location information for custom memory regions defined at least in part by the hardcoded memory address symbols;

generating one or more region conditions that verify that the memory regions satisfy memory region capacity constraints based on the cumulative sizes of variables designating each custom memory region; and evaluating the region conditions and signaling an error in response to violation of one of the region conditions.

28. The method of claim 27, wherein the custom memory regions are defined in the CDF.

29. The method of claim 26, wherein a source code preprocessor preprocesses the revised link directive file.

30. A method for providing a service that identifies fixed memory address errors in source code at build time for a client, the method performed by executable code stored on a storage device, executed by a processor, and comprising the steps of:

defining a CDF definition file comprising hardcoded memory address symbols that map to fixed memory address values, the CDF referenced both by a compiler of source code and a linker configured to link object code compiled from the source code;

invoking a fixed memory address validation utility that determines size and location information for variables associated with the hardcoded memory address symbols by referencing the object code and the CDF, substitutes fixed memory address values for hardcoded memory address symbols in the link directive file as indicated in the definition file, stores the substituted fixed memory address values in an intermediate file, generates conditions configured to verify that the variables associated with the fixed memory address values satisfy memory boundary constraints, and storing the conditions and the substituted fixed memory address values in a revised link directive file; and invoking a source code build process that preprocesses the revised link directive file and notifies a user of an error in response to violation of one of the conditions.

31. The method of claim 30, further comprising invoking the linker with preassembled object code and the revised link directive file that includes the conditions, the linker producing an executable code image that is free from fixed memory address errors in response to the conditions being satisfied.

32. The method of claim 30, wherein defining the CDF comprises extracting variable definitions that reference fixed memory address values from existing header files and source code files, selectively replacing fixed memory address values with hardcoded memory address symbols, and combining definitions for the hardcoded memory address symbols into the single definition file.

33. The method of claim 30, wherein a service provider defines the CDF file and invokes the fixed memory address validation utility and an end-user invokes the source code build process that evaluates the conditions and notifies a user of an error.

34. The method of claim 30, further comprising pre-building a client's source code by compiling the source code into object code without generating an executable image, the object code referenced by the fixed memory address validation utility to derive size and location information for variables associated with the hardcoded memory address symbols.

35. The method of claim 30, further comprising instructing a client how to define the single definition file using the C programming language such that definitions in the definition file are compatible for use in both source code and in a link directive file.

36. The method of claim 30, further comprising instructing a client how to define the CDF using the C programming language such that custom memory regions in the CDF are compatible for use in both source code and a link directive file.

37. An apparatus for identifying fixed memory address errors in source code at build time, the apparatus comprising:

means for substituting fixed memory address values for hardcoded memory address symbols, a mapping between fixed memory address values and hardcoded memory address symbols defined in a CDF referenced both by a compiler of source code and a linker configured to link object code compiled from the source code, the substituting means comprising executable code stored on a storage device and executed by a processor;

means for determining size and location information for variables associated with the hardcoded memory address symbols by referencing the object code and the CDF, substituting the hardcoded memory address symbols with the fixed memory address values, and storing the substituted fixed memory address values in an intermediate file, the determining means comprising executable code stored on the storage device and executed by the processor;

means for generating one or more conditions that verify that the variables satisfy memory boundary constraints based on the size and location information and storing the conditions and the substituted fixed memory address values in a revised link directive file, the generating means comprising executable code stored on the storage device and executed by the processor; and means for preprocessing the revised link directive file and signaling an error in response to violation of one of the conditions, the preprocessing means comprising executable code stored on the storage device and executed by the processor.

* * * * *